2,703,309

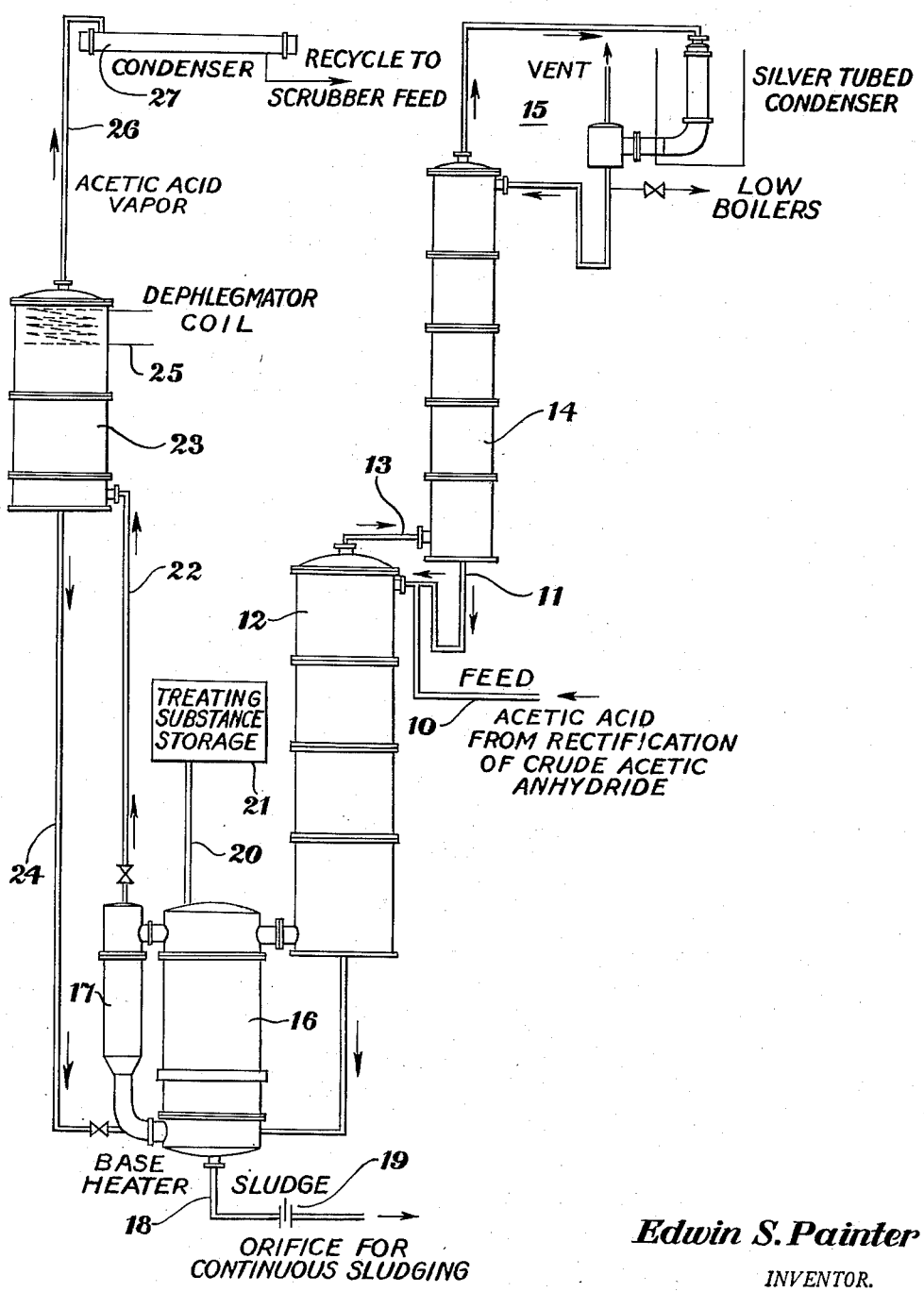

PURIFICATION OF ACIDS FROM THE MANUFACTURE OF ANHYDRIDES

Edwin S. Painter, Kingsport, Tenn., assignor to Eastman Kodak Company, Rochester, N. Y., a corporation of New Jersey Application August 28, 1951, Serial No. 244,048

2 Claims. (Cl. 202—57)

This invention relates to the purification of lower aliphatic acids, such as acetic acid and mixtures of these materials, contained in the crude products from the manufacture of anhydrides, such as acetic anhydride. The invention is particularly concerned with the purification of the acetic acid in the crude product from the manufacture of acetic anhydride from acetic acid, the purification having the purpose of providing acetic acid of sufficient purity for recycling to the acetic anhydride manufacturing process.

In the manufacture of acetic anhydride, as by the reaction of fletene and acetic acid, the two reactants are brought together in one or more scrubbers, and the resulting crude product, in addition to the anhydride, contains acetic acid and various contaminants. In order to render the process more feasible economically, it is important that the acetic acid in the crude product be recovered for reuse in acetic anhydride manufacture. Before it can be reused, however, it must be brought to a certain minimum of purity, and this must be accomplished as simply and cheaply as possible or else the advantages of reuse of the acetic acid will be lost.

In the process to which the invention pertains, the crude anhydride product is first rectified to produce high quality anhydride by any suitable rectification, such as that described in Hull and Saunders application Serial No. 175,268, filed July 21, 1950, now U. S. Patent 2,663,681. A distillatory separation of acetic anhydride and acetic acid is also disclosed in U. S. Patent No. 2,509,877 to Nicolai et al. This is followed by separation of acetic acid in the residue from various contaminants. Satisfactory separation by fractional distillation is very difficult, yet by the simple and inexpensive treatment according to this invention, glacial acetic acid of recycle quality is readily recovered.

I have found that the desired purification can be accomplished in a simple and economical, yet highly efficient manner, by treating the contaminated acetic acid with a substance, for example, phosphoric acid, which is substantially non-reactive with the acetic acid under the conditions of treatment, but which is capable of promoting sludging of certain contaminants which accompany the acid, thus converting these contaminants to high boiling material. Certain low boiling contaminants may be first removed from the crude acid by fractional distillation, the bottoms from this distillation being fed to a reboiler or base heater to which the treating substance is added in very small amounts. The purified acetic acid is removed as vapor, and is of sufficient purity for reuse in the manufacture of acetic anhydride.

It is an object of the invention to provide a method and apparatus for purifying the lower aliphatic acids, such as acetic acid, in the crude reaction product from the manufacture of anhydrides such as acetic anhydride.

A further object of the invention is to provide a method and apparatus for purifying acetic acid in the crude reaction product from the manufacture of acetic anhydride from acetic acid, the purification providing acetic acid of sufficiently high purity for reuse in the manufacture of acetic anhydride.

These and other objects of the invention will be readily understood from the following specification, when taken in conjunction with the accompanying drawing, in which the figure shows apparatus for carrying out the purification of acetic acid from the crude anhydride product after the anhydride has been removed, as by rectification.

Turning now to the drawing in further detail, there is shown a feed line 10 for bringing the contaminated acetic acid from the rectification apparatus as mentioned, wherein the acetic anhydride is removed. Line 10 connects through a portion of line 11 into the head of a column 12, which in one embodiment was a 51 plate bubble cap column. Column 12, which may alternatively be a packed column, is connected by line 11 and line 13 with a suitable reflux arrangement which includes a column 14 through which low boiling material is removed from the material fed to column 12. Column 14 may be a 31 plate column, but the details of column 14 and its reflux arrangement 15 form no part of the present invention, as it is sufficient that they provide for removal of low boilers from column 12.

Column 12 is connected to a base heater or reboiler 16 heated in any suitable manner and having an external leg 17. A connection 18 for removal of sludge is provided in the bottom of base heater 16, and this connection may include an orifice for continuous sludging, as shown diagrammatically at 19.

Connected to the top of the reboiler 16 is a line 20 connected to storage means 21 for a treating substance which is fed into reboiler 16, as will be discussed in greater detail presently.

External leg 17 is connected at its upper end by a line 22 to a column 23 connected by return line 24 in a reflux arrangement with the lower end of external leg 17. A water cooled dephlegmator coil 25 is located in the upper portion of column 23. The upper end of this column is connected by line 26 to a condenser 27, from which the condensate may be returned to the scrubber (not shown) wherein the acetic anhydride is made.

Phosphoric acid ($H_3PO_4$) has been found to be one of the best materials for adding to the acetic acid to accomplish the desired purification, and an example utilizing this material will now be given.

The crude anhydride product, after rectification to remove anhydride, is fed through line 10 to 51 plate column 12. Low boiling material is removed at the top of the column at a head temperature of about 95° C. at about a 10:1 reflux ratio. The bottoms from this column, consisting of acetic acid and contaminants including high boiling materials, overflow into reboiler or base heater 16 into which 85% phosphoric acid is added through line 20 at a rate of about 5 pounds per 10,000 pounds of acetic acid treated. Acetic acid vapors are removed through a ten plate column 23 at a 0.5:1.0 reflux ratio controlled by dephlegmator coil 25. The acid vapors are condensed in condenser 27 and the resulting acetic acid is water white and without any trace of unsaturated or low boiling compounds. It can be recycled for reuse in manufacturing acetic anhydride.

While not wishing to be bound by any theory as to the operation of the treating material, it appears that the phosphoric acid promotes the polymerization and decomposition of contaminating by-products, converting them to sludges and high boilers from which the acetic acid is readily separated. Many of these contaminating materials boil in the same range as the acid, so that separation by distillation alone is quite difficult.

The example given was carried out under atmospheric pressure, but the invention is equally applicable to the distillation of aliphatic organic acids either under reduced or elevated pressure conditions. The limiting upper temperature in the reboiler is the temperature at which decomposition of the acid by the treating agent is experienced, and in the case of phosphoric acid, this temperature is about 250° C. The upper limit in quantity of phosphoric acid is about 5% of the quantity of acetic acid treated, but only enough need be used to accomplish the desired purification, and ordinarily a much smaller amount than 5% would be used.

In place of phosphoric acid, several mineral acids can be used, including sulfuric acid, hydrochloric acid, nitric acid and other acidic materials such as acetyl sulfonic acid, ethyl dihydrogen phosphate, diethyl hydrogen phosphate, and homologues of the acid phosphates and sulfate esters. Similarly esters and acids of the meta phosphates are useful in this process, as are amino phosphate compounds.

Inasmuch as these treating substances are used in exactly the same manner as phosphoric acid and with the same apparatus, it does not appear necessary to give separate working examples for each of these compounds.

I claim:

1. In a process for manufacturing acetic anhydride by the reaction of acetic acid and ketene, wherein the crude product is rectified to separate acetic anhydride from the unreacted acetic acid and contaminants, the novel combination of steps comprising subjecting the rectified product to distillation with the addition of heat to distill off low boiling contaminants from the unreacted acid, contacting the rectified product during said heating with about 0.05% by weight of an acidic substance selected from the group consisting of phosphoric acid, sulfuric acid, acetyl sulfonic acid, ethyl dihydrogen phosphate and diethyl hydrogen phosphate, whereby high boiling contaminants are converted to readily removable sludge, removing acetic acid as vapor from said heating step to a further rectification step constituting a reflux arrangement for said heating step, removing acetic acid vapor of high purity from said further rectification step, and recycling the acetic acid, thus recovered, to the acetic acid-ketene reaction step.

2. A process according to claim 1 wherein the acidic substance is phosphoric acid.

References Cited in the file of this patent

UNITED STATES PATENTS

| | | |
|---|---|---|
| 1,699,255 | Siedler et al. | June 15, 1929 |
| 1,865,887 | Cochran | July 5, 1932 |
| 2,227,979 | Othmer | Jan. 7, 1941 |
| 2,249,847 | Murray | July 22, 1941 |
| 2,403,769 | Tuerck et al. | July 9, 1946 |